Feb. 13, 1945. A. R. K. DIURSON 2,369,543
VEHICLE BRAKE CONTROL
Filed Feb. 16, 1942 2 Sheets-Sheet 2
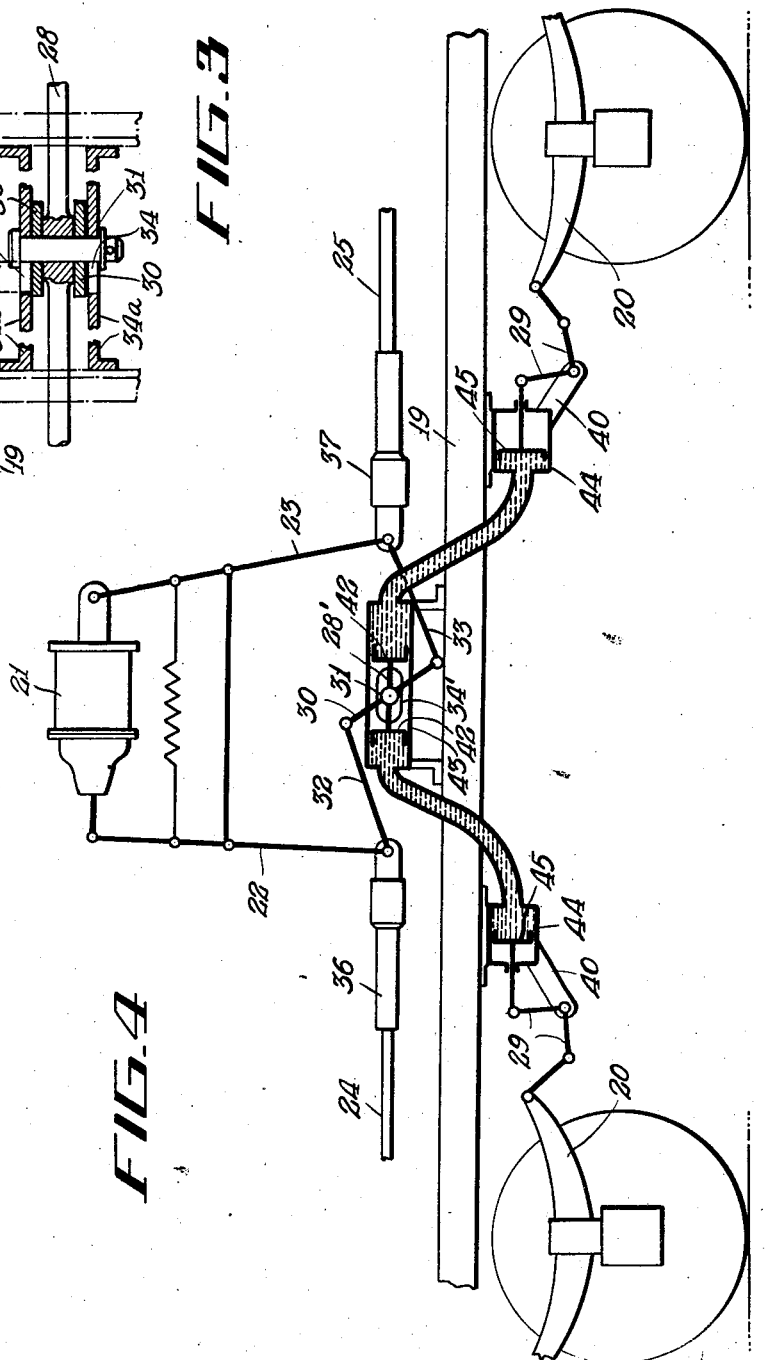
Inventor:
AXEL RUDOLF KONRAD DIURSON,
by C. F. Wenderoth
Attorney Patented Feb. 13, 1945

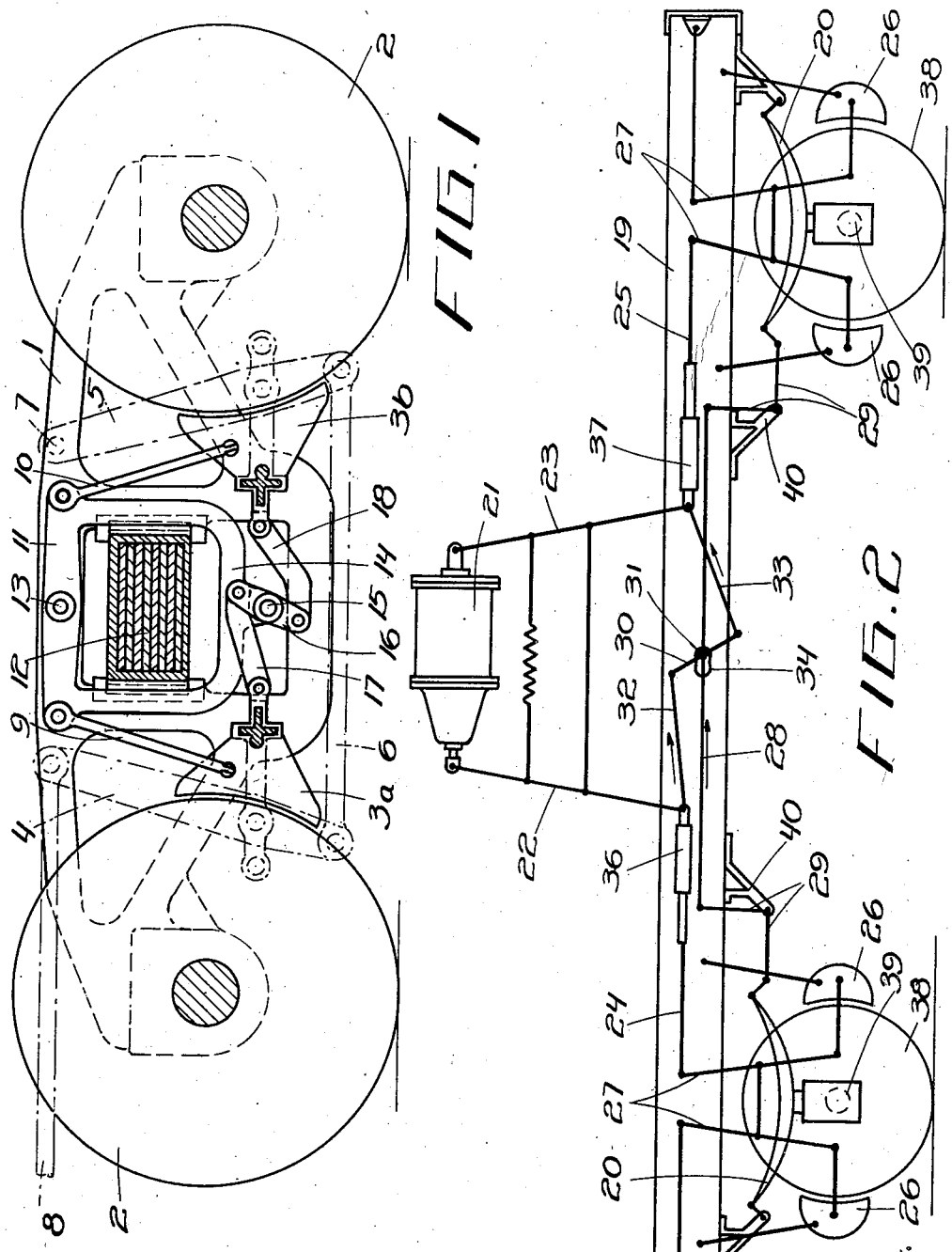

2,369,543

UNITED STATES PATENT OFFICE 2,369,543

VEHICLE BRAKE CONTROL

Axel Rudolf Konrad Diurson, Malmo, Sweden, assignor to Svenska Aktiebolaget Bromsregulator, Malmo, Sweden, a corporation of Sweden Application February 16, 1942, Serial No. 431,155
In Sweden May 20, 1941

15 Claims. (Cl. 188—195)

This invention relates to vehicle brakes and especially to railway vehicle brakes in which brake shoes are provided for application to the wheels of the vehicle at both ends thereof. More particularly the invention relates to vehicle brakes of this type, in which the brake shoes for application to the wheels at the opposite ends of the vehicle are connected to a common source of brake power, for instance a fluid pressure brake cylinder, by a brake rigging for transmitting the brake power to the brake shoes at the opposite ends of the vehicle.

Under service conditions the distribution of the weight of the vehicle and the load thereof on the wheels at the opposite ends of the vehicle may vary within rather indeterminate limits. The load on the vehicle may be nonuniformly distributed between the ends thereof, so that a greater part of the load is imposed on the wheels at one end of the vehicle than on the wheels at the other end of the vehicle. When the vehicle is running the distribution of the weight of the vehicle and the load thereof on the wheels at the opposite ends of the vehicle varies with the rise or slope of the railway line. Further, during braking of the vehicle when running, the vehicle is subjected to a moment of forces created by the intertia of the vehicle and the load thereof and by the friction of the braked wheels of the vehicle against the rails, which moment of forces may materially change the distribution of the weight of the vehicle and the load thereof on the wheels at the opposite ends of the vehicle, especially in case the vehicle is a bogie or truck and the load thereof is a car body pivotally supported at one end on the bogie or truck. Having regard to the direction in which the vehicle is running when braking occurs, the said moment of forces acts in the direction of increasing the part of the weight of the vehicle and the load thereof reposing on the wheels at the foremost end of the vehicle and correspondingly decreasing the part of said weight reposing on the wheels at the hindmost end of the vehicle.

The vehicle may run sometimes in one direction, sometimes in the other direction, and generally sometimes the wheels at one end, sometimes the wheels at the other end of the vehicle may be or become more loaded than the wheels at the opposite end of the vehicle at or during a braking operation. For this reason the general practice is to construct the brake rigging so that it distributes the brake power equally on the brake shoes coacting with the wheels at the two ends of the vehicle, so that the pressures of the brake shoes against the wheels of the vehicle at the two ends thereof will be equal.

In vehicle brakes of the kind above referred to it has been necessary, for not running the risk of sliding the wheels at one end or the other of the vehicle at a full brake application, to limit the braking ratio (that is the ratio of the total pressure of the brake shoes against the wheels of the vehicle to the weight of the vehicle and the load thereof) to a relatively low value due to the fact that it has been necessary, when calculating this value, to take into account the rather indeterminate limits within which the distribution of the weight of the vehicle and the load thereof on the wheels at the opposite ends of the vehicle may vary under service conditions. In other words, it has been necessary to limit the braking ratio to a value sufficiently low for avoiding the risk of the ratio of the pressure of the brake shoes against the wheels at one end or the other of the vehicle to the part of the weight of the vehicle and the load thereof reposing on the wheels at the respective end of the vehicle becoming too high due to nonuniform distribution of said weight on the wheels at the opposite ends of the vehicle.

One object of the invention is to make possible an increase of the braking ratio without running the risk of sliding the wheels at one end or the other of the vehicle.

Another object of the invention is to vary the distribution of the total pressure of the brake shoes against the wheels at the opposite ends of the vehicle automatically according to variations in the distribution of the weight of the vehicle and the load thereof on the wheels at the opposite ends of the vehicle.

Still another object of the invention is to vary the distribution of the total pressure of the brake shoes against the wheels at the opposite ends of the vehicle automatically in dependence on the direction in which the vehicle is running when braking occurs, for increasing the pressure of the brake shoes against the wheels at the foremost end of the vehicle and correspondingly decreasing the pressure of the brake shoes against the wheels at the hindmost end of the vehicle.

Still another object of the invention is to derive from the friction of the braked wheels against the brake shoes a force acting in one direction or the other according to whether the vehicle is running in one direction or the other when braking occurs, and to distribute said force in opposite directions on the brake shoes at the opposite ends of the vehicle, namely in the direction for increasing the pressure of the brake shoes against the wheels at the foremost end of the vehicle, and in the direction for decreasing the pressure of the brake shoes against the wheels at the hindmost end of the vehicle.

Still another object of the invention, when applied to a brake for a vehicle having supporting springs at its opposite ends, is to derive from the supporting spring pressures at the opposite ends of the vehicle a force which is proportional to the difference between said supporting spring pressures and acts in one direction or the other according to whether the supporting spring pressure at one end or the other of the vehicle is the greater one, and to distribute said force in opposite directions on the brake shoes at the opposite ends of the vehicle, namely in the direction for increasing the pressure of the brake shoes against the wheels at the end of the vehicle at which the supporting spring pressure is the greater one, and in the direction for decreasing the pressure of the brake shoes against the wheels at the opposite end of the vehicle.

With these and further objects in view, which will become apparent from the following description in which reference is had to the accompanying drawings, the invention consists in the principal features and in the arrangement, construction and combination of parts, which will be described hereinafter by way of examples shown on the drawings, and then pointed out in the appendant claims.

In the drawings:

Fig. 1 is a somewhat diagrammatic sectional side view of a railway vehicle in the form of a bogie or truck for pivotally supporting a car body at one end thereof, and illustrates one form of the invention as applied to the brakes of such a bogie or truck for the purpose of compensating, wholly or in part, for such changes in the distribution of the weight of the bogie or truck and the load thereon upon the wheels at the opposite ends of the trucks as are caused, when braking, by the inertia of the car body supported on the bogie or truck and by the friction of the braked wheels of the bogie or truck against the rails.

Fig. 2 is a diagrammatic side view of a railway vehicle having two axles and springs for supporting the frame of the vehicle from said axles, and diagrammatically illustrates one form of the invention as applied to the brakes of such a vehicle for the purpose of compensating, wholly or in part, for nonuniform distribution of the weight of the vehicle and the load thereof on the two axles at the opposite ends of the vehicle.

Fig. 3 is a horizontal detail section corresponding to the showing in Fig. 2 of the slot 34 and the parts cooperating therewith.

Fig. 4 is a diagrammatic side view of a further embodiment of the invention, parts being omitted for the sake of clearness.

Referring first to Fig. 1, 1 denotes the frame of the bogie or truck and 2 the wheels thereof. Brake shoes 3a and 3b are provided for application to the wheels at the opposite ends of the truck. In the form shown these brake shoes are arranged only on the sides of the two wheel axles facing each other. The brake shoes 3a and 3b are connected in the usual manner to two brake levers 4 and 5, respectively, for pressing the brake shoes against the wheels. The two brake levers 4 and 5 have their lower ends interconnected by means of a connecting rod 6. The upper end of the lever 5 is pivoted to the truck frame 1 at 7, and the upper end of the lever 4 is connected by means of a brake rod 8 to a source of brake power not shown. The brake shoes 3a and 3b are connected by means of suspension rods 9 and 10, respectively, to the opposite ends of a two-armed lever 11 preferably arranged above the bolster 12 which is arranged in the usual manner in the truck frame for resiliently supporting one end of a car body on the truck, such body being not shown herein. The lever 11 is pivoted in the truck frame 1 at 13. The two arms of the lever 11 are equal in length. Connected to the lever 11, or preferably made integral therewith, is a downwardly projecting loop-shaped arm 14 embracing the bolster 12 but being free to be rocked in both directions together with the lever 11. Pivoted at 15 to the lower end of the arm 14 is a double-armed lever 16 to the opposite ends of which the brake shoes 3a and 3b are connected by means of links 17 and 18, respectively.

The operation of the form of the invention illustrated in Fig. 1 is as follows. Supposing the vehicle to be running in such a direction that the right end of the truck, as viewed in Fig. 1, is the foremost one, the frictional forces which the wheels exert on the brake shoes during a braking operation will tend to move the brake shoes 3b at the foremost end of the truck upwardly, and the brake shoes 3a at the hindmost end of the truck downwardly. By the suspension rods 9 and 10 for the brake shoes the said forces are transmitted to the lever 11 and exert a torque thereon, tending to rotate the lever 11 and its arm 14 on the pivot 13 in the anti-clockwise direction, as viewed in Fig. 1. Thus the said torque tends to move the pivot 15 of the lever 16 towards the brake shoes 3b at the foremost end of the truck, and away from the brake shoes 3a at the hindmost end of the truck, so that the torque will be taken up by creating a pressure in the link 18 and a corresponding pull in the link 17. The pressure in the link 18 acts on the brake shoes 3b in the same direction as the brake pressure transmitted to the brake shoes 3b by the lever 5 and thus in fact increases the effective brake pressure of the brake shoes 3b against the foremost wheels of the truck, whereas the pull in the link 17 acts on the brake shoes 3a in the opposite direction to the brake pressure transmitted to the brake shoes 3a by the lever 4 and thus in fact decreases the effective brake pressure of the brake shoes 3a against the hindmost wheels of the truck.

Should the vehicle be running in the other direction at a braking operation, so that the left end of the truck is the foremost one, the torque exerted on the lever 11 by the frictional forces exerted by the wheels on the brake shoes will tend to rotate the lever 11 and its arm 14 in the clockwise direction, as viewed in Fig. 1, so that the torque on the lever 11 also in this case will produce an increase of the effective brake pressure of the brake shoes 3a against the foremost wheels of the truck, and a corresponding decrease of the effective brake pressure of the brake shoes 3b against the hindmost wheels of the truck.

Turning now to Fig. 2, 19 denotes the vehicle frame and 38 the wheels at the opposite ends of the vehicle. The vehicle frame is supported from the two wheel axles 39 by springs 20. The vehicle is provided with a brake comprising a fluid pressure brake cylinder 21, interconnected main live and dead brake levers 22 and 23 and main brake pull rods 24 and 25 extending from said main brake levers towards the opposite ends of the vehicle for transmitting brake power to brake shoes 26 arranged for coaction with the wheels at the opposite ends of the vehicle, the brake shoes being connected to said pull rods 24 and 25 by the intermediary of brake levers 27 in a well-known manner. Between the wheels at the opposite ends of the vehicle there is provided a rod 28 movable longitudinally of the vehicle in both directions. The two ends of the rod 28 are coupled to levers 29 arranged for deriving forces from the supporting spring pressures at the respective ends of the vehicle, which forces act upon the rod 28 in opposite directions and are proportional to the respective parts of the weight of the vehicle and the load thereof reposing on the wheel axles at the respective ends of the vehicle. According to the construction illustrated by way of example in Fig. 2 the two levers 29 are pivoted to brackets 40 secured on the vehicle frame 19, and the said levers are arranged to be acted upon by the reactive forces of the supporting spring pressures, for which purpose the springs 20 are hinged at one of their ends to the respective levers 29. A double-armed lever 30 is pivoted at 31 to the rod 28 about midway between its ends. The ends of the lever 30 are coupled by means of link rods 32 and 33 to the ends of the respective brake levers 22 and 23 to which the brake pull rods 24 and 25 are connected. The movement of the rod 28 is limited in both directions, for instance by projecting ends of the pivot pin 31 for the lever 30 for movement to the extent $d$ in limited slots 34 or the like formed in plates 34a secured by brackets or the like to the vehicle frame 19, so that the rod 28 can move only through a distance which is materially smaller than the one corresponding to the slack consuming stroke of the brake rigging. By this measure the rod 28 is prevented from pulling the two pull rods 24 and 25 so long towards one end or the other of the vehicle at released brake that the brake shoes at the opposite ends of the vehicle are moved into contact with, or too near, the wheels. Preferably each of the pull rods 24 and 25 is provided with an automatic slack adjuster 36 and 37, respectively, for keeping the position of the live and dead brake levers 22 and 23 at applied brake unchanged independently of the brake shoe wear.

The operation of the form of the invention now described with reference to Fig. 2 is as follows. Supposing that the left wheel axle 39, as viewed in Fig. 2, carries a greater part of the weight of the vehicle and the load thereof than the right wheel axle, for instance due to the load of the vehicle being nonuniformly distributed between the ends thereof, this results in the rod 28 being acted upon by a force which is proportional to the difference between the loads on the two wheel axles and acts for moving the rod 28 to the right into the right end position of slot 34 shown in Fig. 2. The movement of rod 28 acting on pin 31 and lever 30 moves the brake shoes nearer the wheel 38 at the left end of the vehicle, and farther from the wheel 38 at the right end of the vehicle prior to the application of force to said shoes from brake cylinder 21. At application of the brake the ends of the brake levers 22 and 23 to which the pull rods 24 and 25 are connected, are moved towards each other, and during this movement the rod 28 remains in the right end position until the brake shoes at the left end of the vehicle have been moved into contact with the wheels. Thereafter the resistance against further movement of the pull rod 24 to the right increases, and due to this increased resistance the rod 28, through its connection 30, 32, 33 with the aforesaid brake lever ends, is forced to the left by the continued movement of these brake lever ends towards each other, until also the brake shoes at the right end of the vehicle have been moved into contact with the wheels. The rod 28 now takes a floating position, so to say, between its two end positions, so that, during the following development of the braking power, the force derived from the vehicle supporting spring pressures and acting upon the rod 28 is transmitted by the connection 30, 32, 33 to the brake levers 22 and 23 and thereby to the main brake pull rods 24 and 25 in such a manner that the said force increases (acts in the same directions as) the force transmitted from the brake cylinder 21 to the main brake pull rod 24, and to the same extent decreases (acts in the opposite direction to) the force transmitted from the brake cylinder 21 to the main brake pull rod 25. Consequently, the wheels at the left end of the vehicle, which carry the greater part of the weight of the vehicle and the load thereof, are braked with a higher brake pressure than the wheels at the right end of the vehicle, which carry the smaller part of the said weight. Reversedly, the wheels at the right end of the vehicle will be braked with a higher brake pressure than the wheels at the left end of the vehicle in case the greater part of the weight of the vehicle and the load thereof instead is on the wheels at the right end of the vehicle. Obviously this change in the distribution of the total brake pressure on the wheels at the opposite ends of the vehicle according to which of the two wheel axles that carries the greater part of the weight of the vehicle and the load thereon, is independent of the cause of the nonuniform distribution of said weight on the two wheel axles. Thus, as soon as there is a different between the two parts of the weight of the vehicle and the load thereon reposing on the two wheel axes at or during a braking operation, the device acts so as to compensate for this difference, wholly or in part, by producing a corresponding difference between the brake shoe pressures against the wheels at the opposite ends of the vehicle irrespective of whether the nonuniform distribution of the said weight on the two wheel axles is caused by nonuniform distribution of the load on the vehicle between the ends thereof, or by the moment of forces created by the inertia of the vehicle and the friction of the braked wheels against the rails during the braking operation, or by rise or slope of the railway line, or by something else.

The invention is by no means limited to the forms particularly described herein and illustrated on the drawings by way of examples. For instance, the invention is independent of such means as may be provided in the brake rigging, or elsewhere, for adjusting the braking power at a full brake application according to the load of the vehicle (empty-load change-over device). The invention can be used in the same manner and to the same advantage whether the brake is provided with such adjusting means or not. It is only preferable, but not necessary, to derive the force which, according to the invention, is used for increasing the brake shoe pressure against the wheels at one end or the other of the vehicle and for correspondingly decreasing the brake shoe pressure against the wheels at the opposite end of the vehicle, from the inertia or the weight of the vehicle and the load thereon as herein described. The said force may also be produced in any other suitable manner. For instance the source of said force may be in the form of a fluid pressure cylinder put under the control of the wheel axle pressures at the opposite ends of the vehicle. Thus, in the embodiment shown diagrammatically in Fig. 4, lever 30 is pivoted at 31 to rod 28', the ends of lever 30 being coupled, as in the aforedescribed embodiment, by means of link rods 32 and 33 to the ends of the respective brake levers 22 and 23 to which the brake pull rods 24 and 25 are connected. The movement of the rod 28' is limited in both directions by the arrangement of the pin 31 in slots 34' formed in the cylinder 43 secured by brackets or the like to frame 19. The ends of rod 28' are connected to two pistons 42 moving in the cylinder 43. The ends of the latter are severally connected to cylinders 44, each containing a piston 45 acted upon by levers 29 at the opposite ends of the vehicle, the interconnected chambers of the cylinders 43 and 44 and the connections therebetween being filled with a pressure transmitting fluid.

What I claim and desire to secure by Letters Patent is:

1. A brake for a vehicle such as a railway bogie or truck, comprising brake shoes for application to the wheels of the vehicle at both ends thereof, a brake rigging for transmitting brake power to the brake shoes at both ends of the vehicle from a common source of such power, means for deriving from the friction of the braked wheels of the vehicle against the brake shoes a force acting in one or the other of two opposite directions according to whether the vehicle is running in one direction or the other when braking occurs, and means for distributing said force in opposite directions on the brake shoes at the opposite ends of the vehicle, namely in the direction for increasing the brake power transmitted to the brake shoes at the foremost end of the vehicle, and in the direction for decreasing the brake power transmitted to the brake shoes at the hindmost end of the vehicle.

2. A vehicle brake comprising brake shoes for application to the wheels of the vehicle at both ends thereof, a brake rigging for transmitting brake power to the brake shoes at both ends of the vehicle from a common source of such power, a member disposed between the wheels at the opposite ends of the vehicle and movable longitudinally thereof in both directions within limits, means for actuating said member in either direction, a double-armed lever pivoted on said movable member, and means connecting the brake shoes at the opposite ends of the vehicle to the opposite ends of said lever, for distributing, by actuation of said movable member in opposite directions, the relative slack clearance on the brake shoes at the opposite ends of the vehicle, namely in a direction for increasing the brake power transmitted from said common source to the brake shoes at one end of the vehicle, and for decreasing the brake power transmitted from said common source to the brake shoes at the other end of the vehicle.

3. A brake for a vehicle having supporting springs at both ends, comprising brake shoes for application to the wheels of the vehicle at both ends thereof, a brake cylinder, a brake rigging for transmitting brake power from said brake cylinder to the brake shoes at both ends of the vehicle, said brake rigging comprising interconnected live and dead brake levers associated with said brake cylinder, and main brake pull rods extending from said levers towards the opposite ends of the vehicle, a rod movable within limits in both directions longitudinally of the vehicle, levers pivoted on the vehicle and connecting the opposite ends of said movable rod to the supporting springs at the opposite ends of the vehicle, for deriving from the supporting spring pressures at the opposite ends of the vehicle forces which are proportional to said spring pressures and act in opposite directions on said movable rod, a double-armed lever pivoted on said movable rod at a point between the ends thereof, and rods connecting said main brake pull rods to the opposite ends of said double-armed lever.

4. A brake as claimed in claim 2, in which the movement of said movable member in both directions is limited to a distance sufficiently small for preventing said movable member from moving the brake shoes at one end or the other of the vehicle over the brake shoe clearance into contact with the wheels at released brake.

5. A brake as claimed in claim 3, in which an automatic slack adjuster is provided in each of said main brake pull rods for keeping the brake shoe clearance constant and the position of the live and dead brake levers at released brake unchanged independently of wear of the brake shoes, the extent of movement of said rod being materially smaller than the slack consuming stroke of said brake rigging.

6. A vehicle brake comprising brake shoes for application to the wheels at both ends of the vehicle, a brake rigging for transmitting brake powder to the brake shoes at both ends of the vehicle from a common source of such power, a double-armed lever pivoted on the vehicle substantially midway between the ends thereof so that the two arms of said double-armed lever extend towards the opposite ends of the vehicle, means for suspending the brake shoes at the opposite ends of the vehicle from the opposite ends of said double-armed lever, and for transmitting to said double-armed lever frictional forces exerted by the braked wheels of the vehicle on the brake shoes, so as to produce a torque tending to rotate said double-armed lever in one direction or the other according to whether the vehicle is running in one direction or the other when braking occurs, a downwardly projecting arm on said double-armed lever, a second double-armed lever pivoted on said downwardly projecting arm at the lower end thereof, and links connecting the brake shoes at the opposite ends of the vehicle to the opposite ends of said second double-armed lever.

7. A brake as claimed in claim 6 for a vehicle in the form of a bogie or truck having a bolster for resiliently supporting a car body at one end thereof, in which said first double-armed lever is arranged above the bolster, and in which the downwardly projecting arm on said first double-armed lever is loop-shaped and embraces the bolster but is free to be rocked in both directions together with said first double-armed lever.

8. A vehicle brake comprising brake shoes for application to the wheels of the vehicle at both ends thereof, a brake system for transmitting brake power to the brake shoes at both ends of the vehicles, means for producing a force, in addition to said brake power, acting in one or the other of two opposite directions, and means for adding part of said force to the brake power transmitted to the brake shoes at one end or the other of the vehicle, and subtracting another part of said force from the brake power transmitted to the brake shoes at the opposite end of the vehicle.

9. A vehicle brake comprising brake shoes for application to the wheels of the vehicle at both ends thereof, a brake system for transmitting brake power to the brake shoes at both ends of the vehicle, means for producing a force, in addition to said brake power, acting in one or the other of two opposite directions, and means for adding and subtracting equal parts of said force to the brake power transmitted to the brake shoes at one end or the other of the vehicle, and from the brake power transmitted to the brake shoes at the opposite end of the vehicle, respectively.

10. A vehicle brake comprising brake shoes for braking the wheels of the vehicle at both ends thereof, a brake system for transmitting brake power to the brake shoes at both ends of the vehicle, a member movable longitudinally of the vehicle in both directions within limits, means for applying a force, in addition to said brake power, to said movable member in either direction, and means connecting the brake shoes at the opposite ends of the vehicle to said movable member, for distributing said force in opposite directions on the brake shoes at the opposite ends of the vehicle, namely in the direction for adding part of said force to the brake power transmitted to the brake shoes at one end or the other of the vehicle, and in the direction for subtracting another part of said force from the brake power transmitted to the brake shoes at the opposite end of the vehicle.

11. A vehicle brake comprising brake shoes for braking the wheels of the vehicle at both ends thereof, a brake system for transmitting brake power to the brake shoes at both ends of the vehicle, means operating automatically for producing a force, in addition to said brake power, acting in one or the other of the two opposite directions in dependence of the direction in which the vehicle is running when braking occurs, and means for distributing said force in opposite directions on the brake shoes at the opposite ends of the vehicle, namely in the direction for adding part of said force to the brake power transmitted to the brake shoes at one end or the other of the vehicle, and in the direction for subtracting another part of said force from the brake power transmitted to the brake shoes at the opposite end of the vehicle.

12. A brake for a vehicle such as a railway bogie or truck, comprising brake shoes for braking the wheels of the vehicle at both ends thereof, a brake system for transmitting brake power to the brake shoes at both ends of the vehicle, a member mounted on the vehicle and movable in relation thereto within limits, means for deriving from the friction of the brake shoes against the braked surfaces a force acting upon said member in one or the other of two opposite directions according to whether the vehicle is running in one direction or the other when braking occurs, and means for distributing said force in opposite directions on the brake shoes at the opposite ends of the vehicle, namely in the direction for adding part of said force to the brake power transmitted to the brake shoes at the foremost end of the vehicle, and in the direction for subtracting another part of said force from the brake power transmitted to the brake shoes at the hindmost end of the vehicle.

13. A vehicle brake comprising brake shoes coacting with the wheels of the vehicle at both ends thereof, a brake system for transmitting brake power to the brake shoes at both ends of the vehicle, a member movable in relation to the vehicle frame within limits, means operating automatically in dependence on the weight of the vehicle and the load thereof reposing on the wheels at the opposite ends of the vehicle, for producing a force, in addition to said brake power, acting upon said member in one or the other of two opposite directions according to whether the greater part of said weight reposes on the wheels at one end of the vehicle or on the wheels at the other end of the vehicle, and means for distributing said force in opposite directions on the brake shoes at the opposite ends of the vehicle, namely in the direction for adding part of said force to the brake power transmitted to the brake shoes coacting with the wheels carrying the greater part of said weight, and in the direction for subtracting another part of said force from the brake power transmitted to the brake shoes coacting with the wheels carrying the smaller part of said weight.

14. A brake for a vehicle having supporting springs at its opposite ends, comprising brake shoes coacting with the wheels of the vehicle at both ends thereof, a brake system for transmitting brake power to the brake shoes at both ends of the vehicle, means for deriving from the supporting spring pressures at the opposite ends of the vehicle a force which is proportional to the difference between said supporting spring pressures and acts in one or the other of two opposite directions according to whether the supporting spring pressure at one end or the other of the vehicle is the greater one, and means for adding part of said force to the brake power transmitted to the brake shoes at the end of the vehicle at which the supporting spring pressure is the greater one, and subtracting another part of said force from the brake power transmitted to the brake shoes at the end of the vehicle at which the supporting spring pressure is the smaller one.

15. A brake as claimed in claim 3, in which the movement of said movable rod in both directions is limited to a distance sufficiently small for preventing said movable rod from moving the brake shoes at one end or the other of the vehicle over the normal brake shoe clearance into contact with the wheels at released brake, and in which an automatic slack adjustor is provided in each of said main brake pull rods for keeping the live and dead brake levers in a substantially unchanged position at applied brake, corresponding to a position of said movable rod substantially midway between the limits of the movement of said movable rod.

AXEL RUDOLF KONRAD DIURSON.